(12) United States Patent
Wilks (10) Patent No.: US 6,354,951 B1
(45) Date of Patent: Mar. 12, 2002

(54) DRIVE ASSEMBLY WITH A SETTING DEVICE

(75) Inventor: Eberhard Wilks, Daufenbach (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 09/653,796

(22) Filed: Sep. 1, 2000

(30) Foreign Application Priority Data

Sep. 9, 1999 (DE) ......................................... 199 43 208

(51) Int. Cl.$^7$ ................................................ F16D 3/10
(52) U.S. Cl. ...................................... 464/117; 464/160
(58) Field of Search ............................... 464/117, 160, 464/179, 185; 74/577 R, 577 S, 577 M (56) References Cited

U.S. PATENT DOCUMENTS

| | | | | |
|---|---|---|---|---|
| 414,545 A | * | 11/1889 | Jones | 74/577 R |
| 769,401 A | * | 9/1904 | Pennington | 74/577 S X |
| 1,213,016 A | * | 1/1917 | Reiner | 74/577 S X |
| 2,296,518 A | * | 9/1942 | Greer et al. | 464/117 X |
| 2,349,923 A | * | 5/1944 | Anderson et al. | 464/117 X |
| 3,500,976 A | * | 3/1970 | Halley | 464/160 X |
| 5,964,664 A | * | 10/1999 | Cook et al. | 464/117 |

FOREIGN PATENT DOCUMENTS

| | | |
|---|---|---|
| DE | 3713474 C2 | 12/1989 |
| DE | 3920406 A1 | 3/1990 |
| DE | 4445634 C2 | 10/1997 |
| DE | 19640888 C1 | 5/1998 |
| GB | 2135163 | 8/1984 |

* cited by examiner

Primary Examiner—Lynne H. Browne
Assistant Examiner—Greg Binda
(74) Attorney, Agent, or Firm—Harness, Dickey & Pierce, P.L.C.

(57) ABSTRACT

A drive assembly for an agricultural implement (1) has a first implement portion (2) and a second implement portion (3) pivotable relative to the first implement portion (2) around a pivot axis (x). The first implement portion (2) has a first rotary driving device (4) and the second implement portion (3) has a second rotary driving device (5). The two rotary driving devices (4, 5) are rotationally connected to one another by a shaft assembly (6). The shaft assembly (6) includes a universal joint (7) which adjoins the pivot axis (x). The universal joint (7) includes a cross member with two pairs of arms centered on axes of rotation arranged perpendicularly relative to one another, and two joint yokes. A force-operated setting device (19) transfers the shaft assembly (6) into a rotational position where the axis of rotation of one of the two pairs of arms of the universal joint (7) adjoining the pivot axis (x) at least approaches a parallel line relative to the pivot axis (x). This design enables a pivot movement of the second implement portion (3) relative to the first implement portion (2). A pivot angle is present ranging between 100° and 110°. The implements pivot without the joint yokes of the universal joint (7) contacting one another and without the universal joint (7) being destroyed as a result of any jamming and distortion.

8 Claims, 7 Drawing Sheets

DRIVE ASSEMBLY WITH A SETTING DEVICE

CROSS-REFERENCE TO RELATED APPLICATION

This application is based upon and claims priority to German Patent Application 199 43 208.2 filed Sep. 9, 1999, which application is herein expressly incorporated by reference.

BACKGROUND OF THE INVENTION

The invention relates to a drive assembly for an agricultural implement. The drive assembly has at least two implement portions. The first implement portion includes a first rotary driving device. The second implement portion has a second rotary driving device which is rotationally connected to the first rotary driving device by a shaft assembly. The second implement portion can be pivoted relative to the first implement portion from an active position into an inactive position about a pivot axis.

DE 196 40 888 C1 illustrates an agricultural implement which includes a first implement portion and a pivotable side part. In the operating position, the first implement portion is tilted downwards. In the transport position, the first implement portion is tilted upwards. A driveshaft with two shaft portions is provided to drive the tools associated with the side part. One shaft portion is associated with the first implement portion. The other shaft portion is associated with the side part of the agricultural implement. A coupling enables the two shaft portions to be aligned on a common longitudinal axis and to connect to one another in a rotationally fast way. Two coupling claws of the first shaft portion engage two coupling claws of the second shaft portion. In the engaged position, the two profiled shaft tubes, associated with the shaft portions, can move inside one another. When the side part is tilted upwards, the driveshaft cannot rotate and the shaft portions have to be separated to tilt the side part upwards.

DE 44 45 634 C2 illustrates a free-wheeling coupling which provides a driving connection for agricultural implement drives. The coupling provides two driving directions of rotation. The coupling has an inner ring and an outer ring. Pivotable locking pawls are loaded by springs towards a torque transmitting position. The inner ring is not intended to be rotated into a defined position.

SUMMARY OF THE INVENTION

It is an object of the present invention to propose a drive assembly for an agricultural implement where there is no need to separate the components of the driving connection. Also, there is no need to center the components to re-couple the second implement portion when transferring it from its rest position into the operating position.

In accordance with the invention, the drive assembly comprises at least two implement portions. The second implement portion is pivotable relative to the first implement portion around a pivot axis from an operational position into a rest position. The drive assembly includes a first rotary driving device coupled with the first implement portion. Also, a second rotary driving device is coupled with the second implement portion. A shaft assembly connects the first rotary driving device to the second rotary driving device. The shaft assembly has at least one first universal joint coupled with the first rotary driving device. The universal joint has a cross member with two pairs of arms centered on arm axes which extend perpendicularly relative to one another. A force-operated setting device enables the first universal joint to be transferred into a rotational position where one of its arm axes, in the direction of rotation, at least approaches a parallel line relative to the pivot axis.

An advantage of this embodiment is that the second implement portion is pivotable relative to the first implement portion up to a pivot angle of about 110° around the pivot axis without a need to disconnect the drive connection. Accordingly, this eliminates the risk of the universal joint being destroyed due to an unfavorable angular position of the arm axes relative to the pivot axis.

According to a further embodiment of the invention, the shaft assembly can be transferred by the setting device into a rotational position. Here, the shaft assembly is between an arm axis of the first universal joint and a parallel line relative to the pivot axis. The parallel line extends through the point of intersection of the two arm axes. An angle of rotation exists with a maximum value of 15°. This ensures that the joint yokes do not contact one another if a pivot movement of the second implement portion occurs relative to the first implement portion.

In a preferred further embodiment, the setting device comprises a free-wheeling coupling and a power drive. The free-wheeling coupling has an inner ring connected in a rotationally fast way to one of the drive components. Thus, the free-wheeling coupling is attached to the first rotary driving device or one of the driving means attached thereto; to the second rotary driving device or one of the driving means attached thereto; or to the shaft assembly. Furthermore, the free-wheeling coupling includes an outer ring which is acted upon by the power drive for rotational adjustment purposes. The inner ring and the outer ring are arranged so as to be centered on an axis of rotation.

According to a preferred embodiment, one of the coupling parts of the free-wheeling coupling, preferably the inner ring or the outer ring, includes at least one pivotably supported and spring-loaded locking pawl. The locking pawl may engage at least one recess of the respective other coupling part. During operation, when the shaft connected to the free-wheeling coupling rotates in the driving direction of rotation, the locking pawl is not engaged. Accordingly, the inner ring of the free-wheeling coupling, which is connected to the shaft, freely rotates relative to the outer ring. When the drive is disconnected, the shaft assembly is in a rest position. Also, the outer part is simultaneously rotated by the power drive in the driving direction of rotation. Thus, the locking pawl connects the inner ring and the outer ring of the free-wheeling coupling. When a position of rotation is achieved where the locking pawl is able to engage, the shaft assembly is rotated into the desired position. The rotational path which the outer ring is able to cover with the help of the power drive is such that the desired position of rotation is always reached.

According to a preferred embodiment of the invention, the first rotary driving device or the second rotary driving device include a shaft. The inner ring of the free-wheeling coupling is connected in a rotationally fast way to the shaft. The inner ring is preferably associated with two locking pawls. The locking pawls are each arranged so as to be offset by 180° around the axis of rotation of the shaft. The outer ring includes four recesses which are each arranged at 90° around the axis of rotation.

According to a preferred embodiment of the invention, the power drive is a hydraulic cylinder. The cylinder is connected to the outer ring of the free-wheeling coupling.

Thus, the cylinder is offset relative to the second axis of rotation and to the respective implement portion. The hydraulic cylinder includes a piston. A rotational movement of the outer ring relative to the inner ring of the free-wheeling coupling in the operational direction of rotation of the shaft connected to the inner ring occurs when the piston rod moves out of the cylinder. A single-action hydraulic cylinder is preferred for this function. Accordingly, under the influence of a spring, the hydraulic cylinder again assumes its moved-in position. A switching connection may be present between the hydraulic cylinder and the pivot drive of the agricultural implement. At least the drive component of the agricultural implement, which is attached to the free-wheeling coupling, has to be in its rest position before the hydraulic cylinder is actuated. Thus, the shaft assembly can be moved into the desired rotational position. While the second implement portion carries out a pivot movement relative to the first implement portion, the shaft assembly with the first universal joint is moved into a rotational position with one of the two arm axes of the cross member of the first universal joint approaching a line extending parallel relative to the pivot axis. The desired end position of rotation of the arm axes is reached when the angle between the first implement portion and the second implement portion reaches a maximum value of 60°.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment describing the invention in greater detail is illustrated in the drawings below wherein.

DETAILED DESCRIPTION OF THE PREFERRED EMBODIMENT

Figure 1:
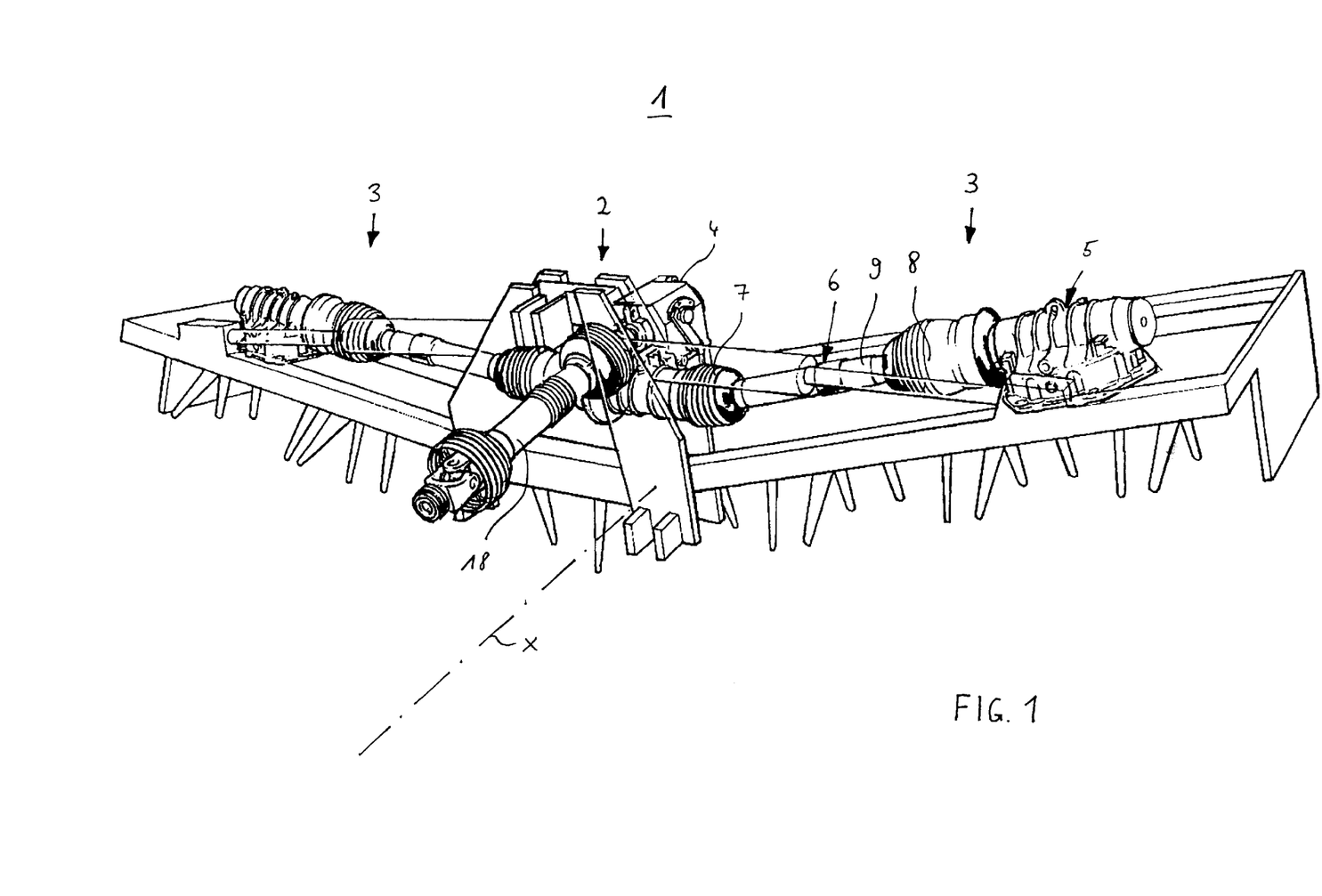
FIG. 1 is a perspective view of an agricultural implement.

FIG. 1 shows an agricultural implement 1 with a first implement portion 2 and two second implement portions 3 connected to the first implement portion 2. The second implement portions 3 are arranged mirror-symmetrically relative to the first implement portion. The two second implement portions 3 can each be pivoted relative to the first implement portion 2 around a separate pivot axis x from an operational position into a rest position.

The first implement portion 2 has a first rotary driving device 4. The first rotary driving device is a main drive. The second implement portions 3 each include a second rotary driving device 5 in the form of a subsidiary drive. The first rotary driving device 4 and the second rotary driving devices 5 are rotationally connected to one another by a shaft assembly 6. The shaft assembly 6 has a driveshaft with universal joints. Each of the two shaft assemblies 6 includes a first universal joint 7 associated with the first rotary driving device 4 of the first implement portion 2. A second universal joint 8 is associated with the second rotary driving device 5 of the respective second implement portion 3. An intermediate shaft 9 connects the two universal joints 7, 8.

Figure 2:
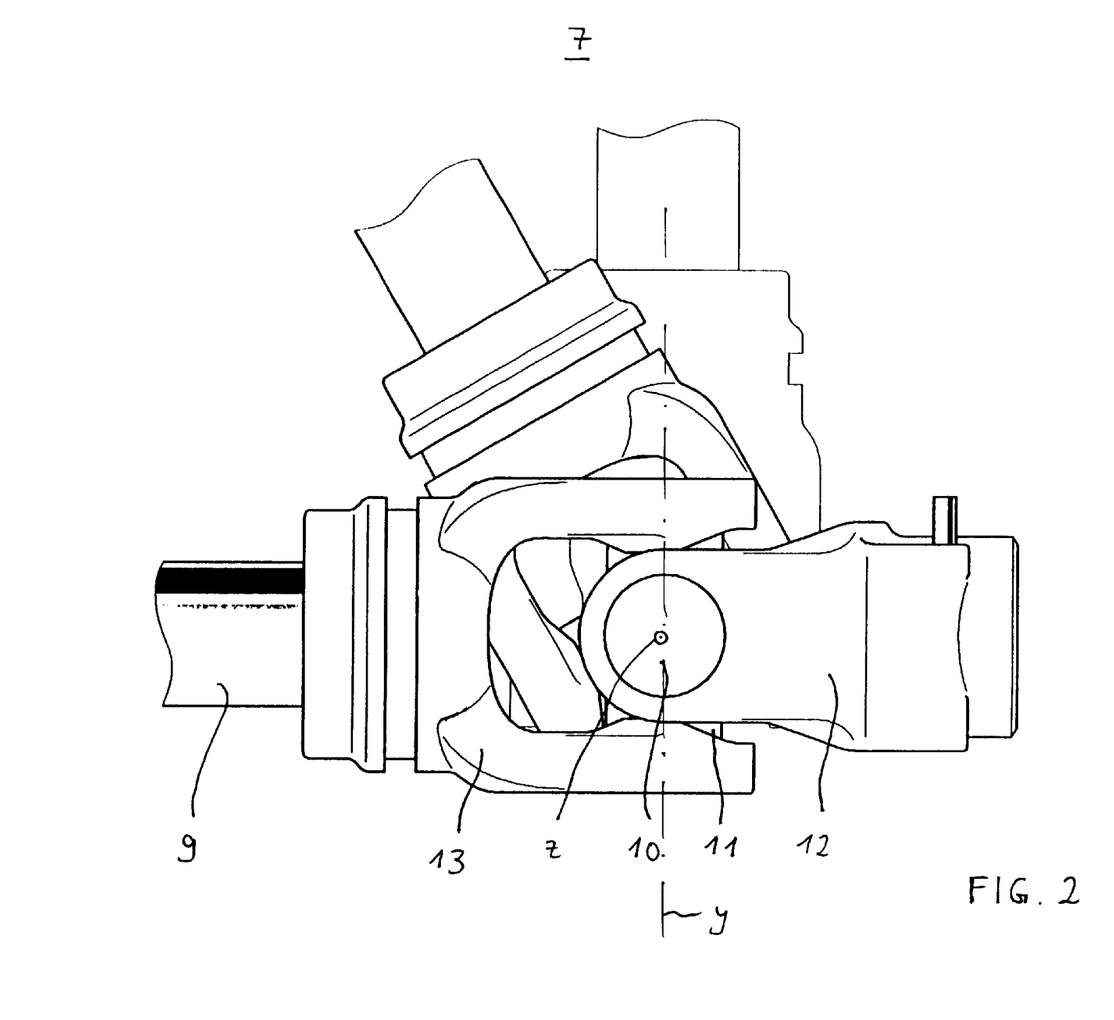
FIG. 2 is a side view of a universal joint according to FIG. 1.

FIG. 2 shows a first universal joint 7 with two pairs of arms 10, 11 positioned perpendicularly relative to one another and intersecting one another. Two joint yokes 12, 13 are each connected to the arm of one of the two pairs of arms 10, 11 to be pivotable around the arm axis y, z.

Figure 3:
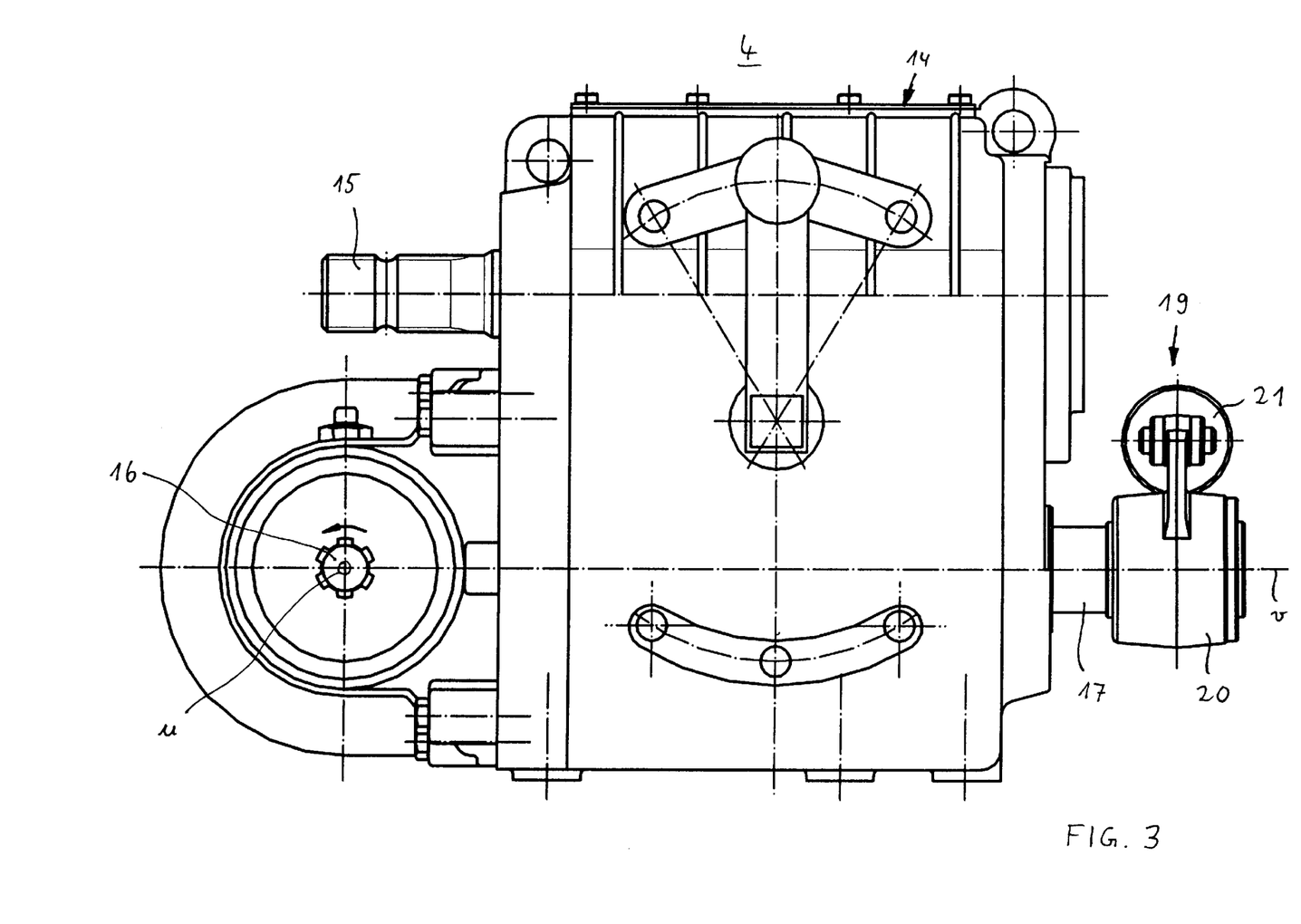
FIG. 3 is a side view of the main drive of the agricultural implement according to FIG. 1.

FIG. 3 shows the first rotary driving device 4 connected to the first implement portion 2. The first rotary driving device drives the two second rotary driving devices 5 of the second implement portion 3, via the shaft assemblies 6. The first rotary driving device 4 includes a housing 14, an input shaft 15 projecting from the housing, and two laterally arranged output shafts 16. Output shaft 16 defines a first axis of rotation u. Free-wheeling shaft 17 defines a second axis of rotation v which is rotationally connected to the two output shafts 16. The input shaft 15 is rotationally connected to a driveshaft 18 which, in turn, is connectable to a power take-off shaft of a tractor.

Figure 8:
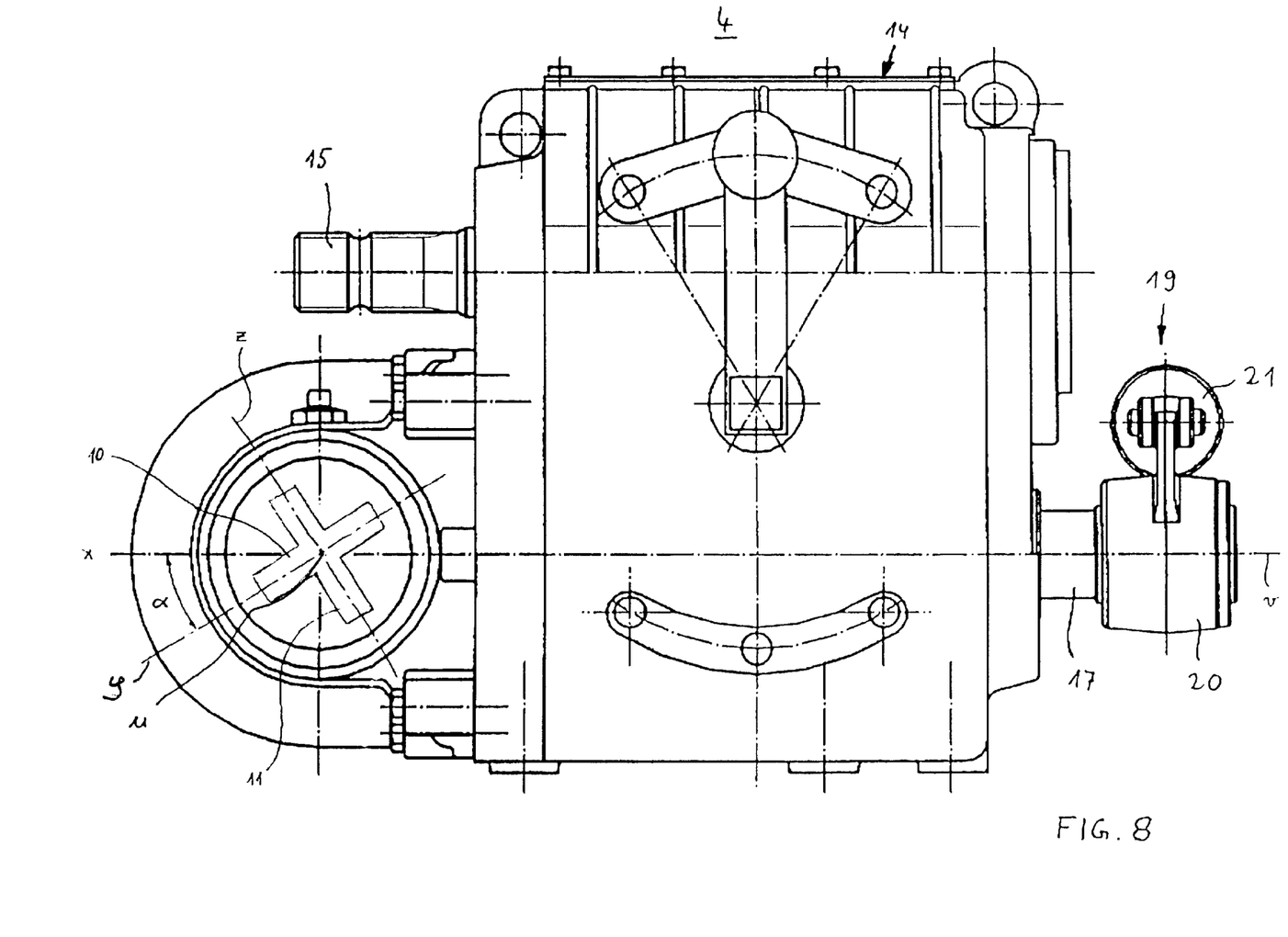
FIG. 8 is a view like FIG. 3 through the universal joint arms.

The two laterally arranged output shafts 16 are connected in a rotationally fast way to the free joint yokes 12 of the universal joints 7 associated with the first rotary driving device 4. The two output shafts 16 are in phase relative to one another. The two universal joints 7 of the two shaft assemblies 6, which are associated with the first rotary driving device 4, and the arm axes y, z, are always in the same rotational position relative to one another. The output shafts 16 and the shaft 17 are driven by the input shaft 15. The shaft 17 and the two output shafts 16 have a transmission ratio of 1:1. This design, when the shaft 17 rotates by a certain angle, causes the output shafts 16 to rotate by exactly the same angle. It also causes a rotation of the input shaft 15. One of the two arm axes y, z of the shaft assembly, in the form of a universal-jointed shaft, in four rotational positions of the output shaft 16, corresponds to a parallel line relative to the pivot axis x. The four rotational positions are uniformly distributed around the circumference. After each quarter rotation, one of the two arm axes y, z at least approaches a parallel line relative to the pivot axis x. An angle of rotation with a maximum value of 15° exists between one of the two arm axes y, z of the first universal joint 7 and a line parallel relative to the pivot axis x. The parallel line extends through the point of intersection of the two arm axes y, z (See FIG. 8). It is also conceivable to have a transmission ratio between the output shafts 16 and the shaft 17 which deviates from the transmission ratio of 1:1. In such a case, the amount would have to be adapted to the rotational movement of the shaft 17, so that the output shafts 16 can be moved into the required rotational position.

The free-wheeling shaft 17 is connected to a setting device 19. The setting device 19 includes a free-wheeling coupling 20 and a power drive 21. The power drive 21 is a hydraulic cylinder.

Figure 4:
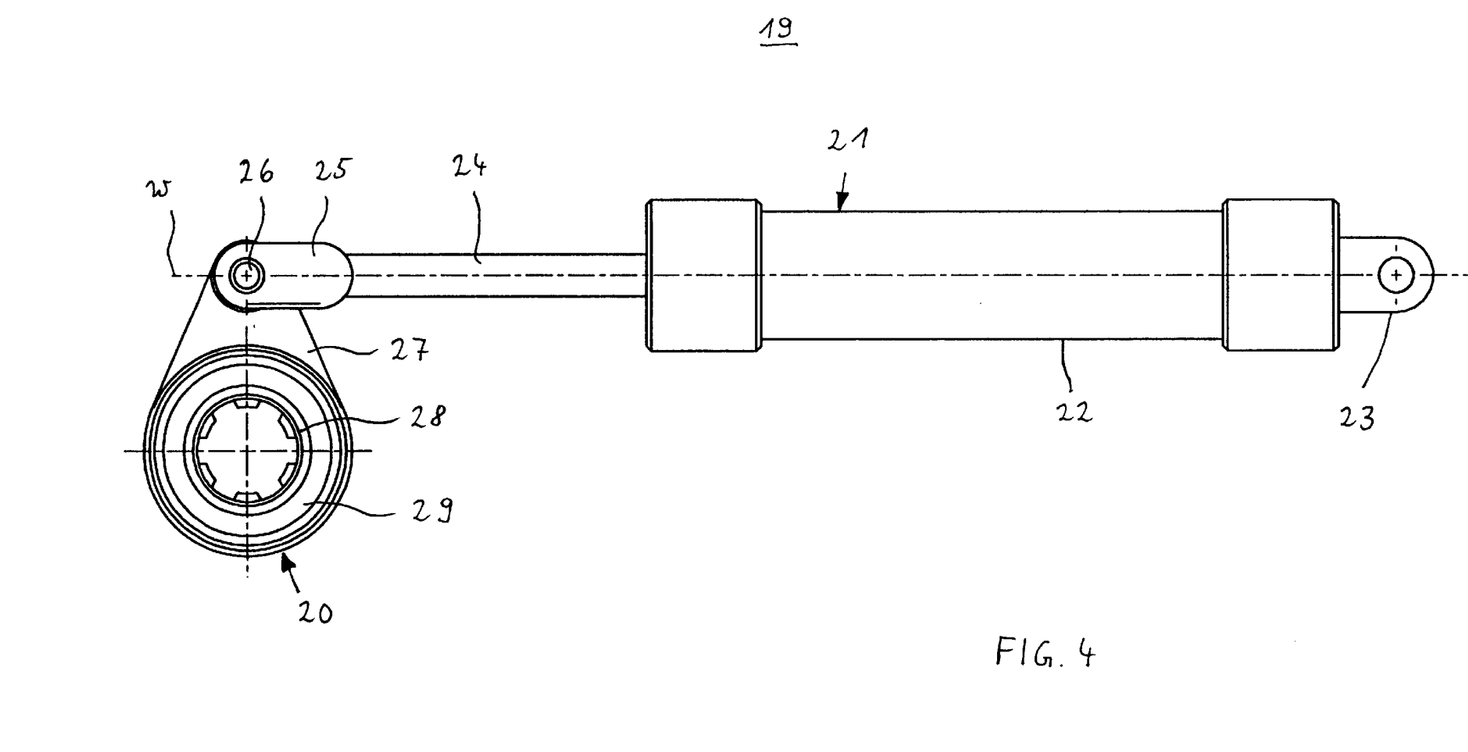
FIG. 4 is a side view of a setting device according to FIG. 3.

FIG. 4 shows a setting device 19. The free-wheeling coupling 20 is switched by the power drive 21. The power drive 21 is a hydraulic cylinder of the single-action type arranged to be centered on a longitudinal axis w. The power drive 21 includes a cylinder 22 with a lug 23 at its first end. A piston of which only the piston rod 24 with a yoke head 25 is shown at the second end. The yoke head 25 of the piston rod 24 is pivotably connected by a pin 26 to a pivot arm 27. The pivot arm 27 is associated with the free-wheeling coupling 20. The longitudinal axis w of the power drive 21 intersects at a distance from the axis of rotation v of the shaft 17. The lug 23 of the power drive 21 is pivotably connected to th e first implement portion 2.

The free-wheeling coupling 20 will be explained in greater detail with reference to FIGS. 5 and 6. The coupling includes an inner ring 28 and an outer ring 29. The pivot arm 27 is firmly connected to the outer ring 29. Two locking pawls 30 are loaded by spring elements 31 between the rings 28, 29.

It can be seen that the inner ring 28 of the free-wheeling coupling 20 is centered on the second axis of rotation v of the shaft 17. The inner ring 28 has a plug-on bore 32 with a multi-spline profile which corresponds to the profile of the shaft 17. The inner ring 28 is associated with the two locking pawls 30.

The locking pawl 30 are received in two recesses 33 in the outer face of the inner ring 28. The locking pawls 30 are arranged so as to be offset by 180° around the axis of rotation v of the second output shaft 17. The pawls 30 have a stepped region holding the spring element 31.

The spring 31 is a leaf spring which is supported between the base of the first recess 33 and the underside of the locking pawl 30. The spring is loaded radially outwardly. One of the side faces 35 of the recess 33 forms a supporting face. The face supports the locking pawl 30 by a corresponding supporting face 34 in the pivoted condition.

Figure 5:
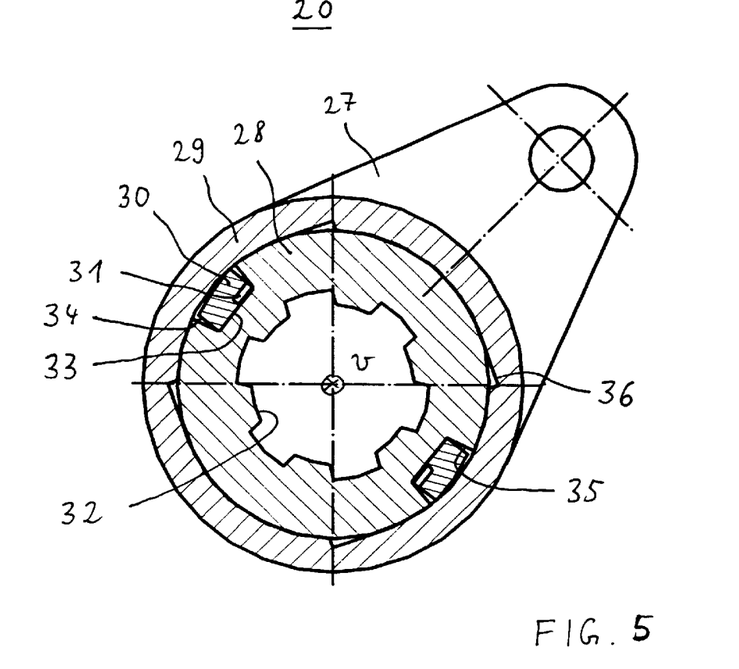
FIG. 5 is a cross-section view of a free-wheeling coupling according to FIG. 3 with the agricultural implement in operation.
Figure 6:
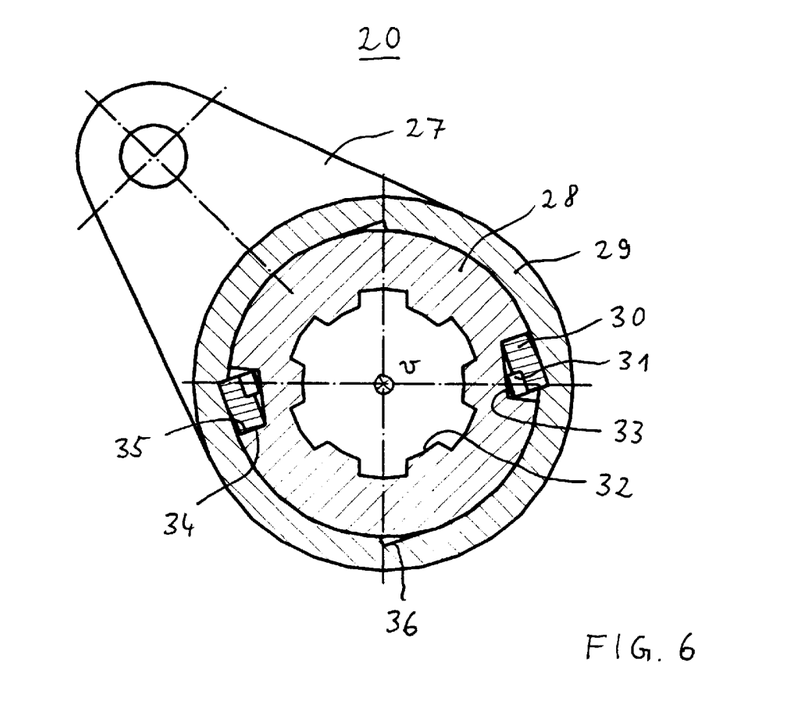
FIG. 6 is a cross-section view according to FIG. 5, with the free-wheeling coupling in the transmitting position.

In FIG. 5, the locking pawls 30 are shown in their withdrawn position. Accordingly, they are positioned inside the outer contour of the inner ring 28. In this position, the locking pawls 30 cannot transmit any torque. The shaft 17 and the output shafts 16 are in operation. The inner ring 28 rotates relative to the stationary outer ring 29 of the free-wheeling coupling 20.

When the two second implement portions 3 are to be pivoted upwards, the power drive 21 hydraulic cylinder is activated. The shaft 17 is in its rest position. The outward movement of the piston 24 causes a pivot movement of the pivot arm 27 of the free-wheeling unit in the operating direction of rotation of the free-wheeling shaft 17 around the second axis of rotation v. The power drive 21 has to be designed such that the path covered by the piston between the moved-in position and the moved-out position causes a 90° rotational movement of the outer ring 29 of the free-wheeling coupling 20.

The outer ring 29 rotates relative to the inner ring 28 of the free-wheeling coupling 20 until the two locking pawls 30 engage the first-available supporting recesses 36 of the outer ring 29. In FIG. 6, the locking pawls 30 are in their outwardly pivoted position. Thus, the pawls 30 engage two of the four supporting recesses 36 in the inner face of the outer ring 29. The four supporting recesses 36 of the outer ring 29 are each offset by 90° around the axis of rotation v of the second output shaft 17. Thus, both locking pawls 30 simultaneously engage two opposed supporting recesses 36.

Accordingly, a rotationally fast connection is provided between the inner ring 28 and the outer ring 29. As the outer ring 29 continues to rotate, the inner ring 28 is rotated until the total rotation of 90° has been achieved. In the end position, the shaft 17 and thus also the output shafts 16 have assumed one of four rotational positions. One of the two arm axes y, z of the shaft assembly 6 connected to the first output shafts 16 corresponds to a parallel line relative to the pivot axis x.

The withdrawal of the piston is effected by a spring. The outer ring 29 of the free-wheeling coupling 20 rotates backwards by 90° in the operating direction of rotation. The inner ring 28 remains in its rotational position.

As far as switching is concerned, the power drive 21 hydraulic cylinder is connected to the pivot drive of the agricultural implement 1. Before the piston of the power drive 21 hydraulic cylinder can be moved out, the drive components of the first rotary driving device 4 must be in a rest position. The outward movement of the piston then causes a rotational movement of the shaft assemblies 6 universal-jointed shafts into the required position.

Figure 7:
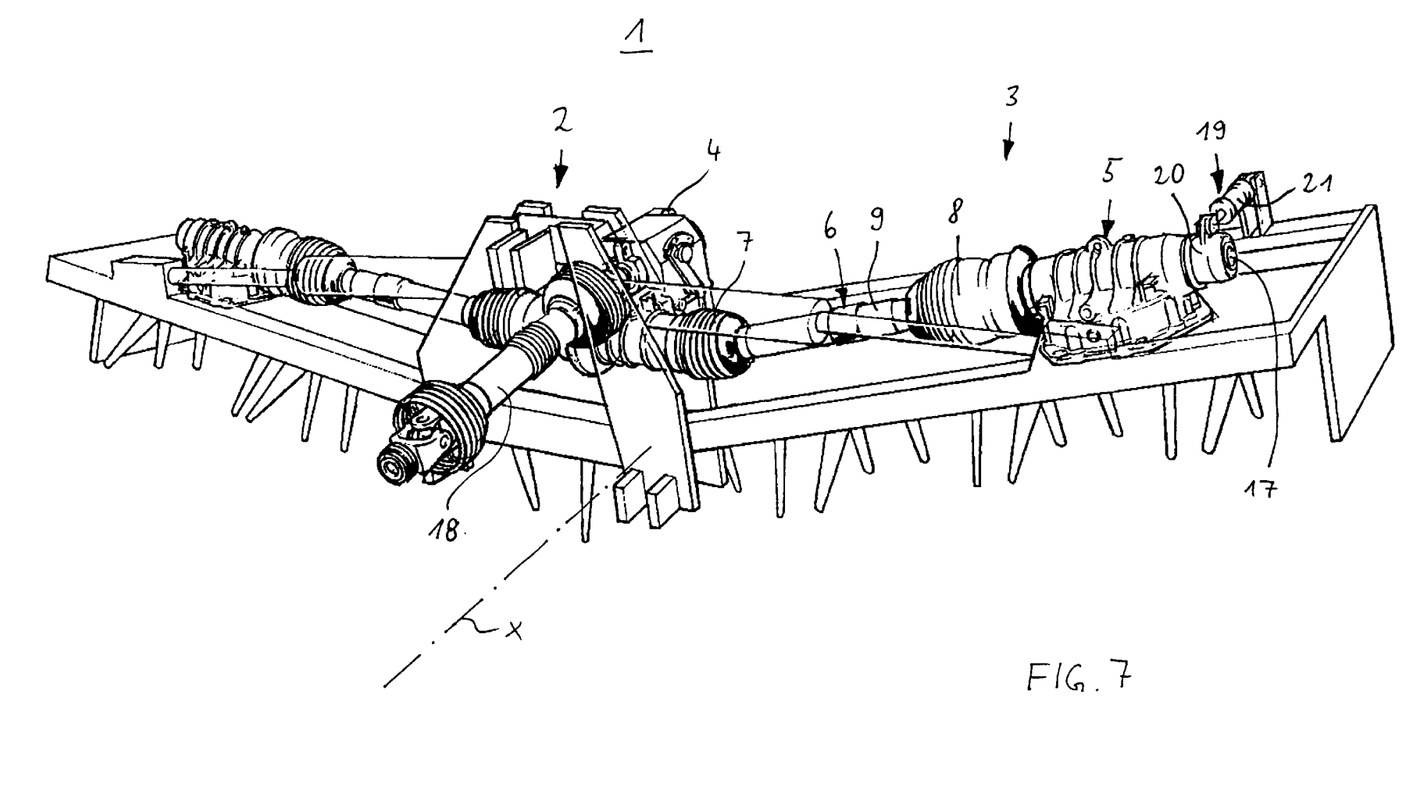
FIG. 7 is a perspective view of an agricultural implement with a setting device arranged on one side.

FIG. 7 shows a variant of the invention. The setting device 19 is associated with the pivotable second implement portion 3 of the agricultural implement 1. The second rotary driving device 5 connected to the second implement portion 3 includes a free-wheeling shaft 17. The inner ring 28 of the free-wheeling coupling 20 is connected in a rotationally fast way to shaft 17. The outer ring 29 of the free-wheeling coupling 20 is connected to the power drive 21 which, in turn, is connected to the second implement portion 3. The functioning mode of the setting device 19 is identical to the above-described functioning mode where the setting device 19 is associated with the first implement portion 2 and the first rotary driving device 4.

While the above detailed description describes the preferred embodiment of the present invention, the invention is susceptible to modification, variation and alteration without deviating from the scope and fair meaning of the subjoined claims.

What is claimed is:

1. A drive assembly for an agricultural implement with at least two implement portions, a first implement portion, and a second implement portion, the second implement portion is pivotable relative to the first implement portion around a pivot axis from an operational position into a rest position, comprising:

a first rotary driving device associated with the first implement portion;

a second rotary driving device associated with the second implement portion;

a shaft assembly connecting the first rotary driving device to the second rotary driving device, said shaft assembly comprises at least one first universal joint associated with the first rotary driving device and said first universal joint comprises a cross member with two pairs of arms centered in arm axes extending perpendicularly relative to one another; and a force-operated setting device for transferring the first universal joint into a rotational position where one arm axes of said first universal joint, in the direction of rotation, at least approaches a parallel line relative to the pivot axis.

2. A drive assembly according to claim 1, wherein the shaft assembly can be transferred by the setting device into a rotational position wherein between one of the two arm axes of the first universal joint and a parallel line relative to the pivot axis, which parallel line extends through the point of intersection of the two arm axes there exists an angle of rotation with a maximum value of 15°.

3. A drive assembly according to claim 1, wherein the setting device includes a free-wheeling coupling and a power drive.

4. A drive assembly according to claim 3, wherein the free-wheeling coupling includes an inner ring connected in a rotationally fast way to said first or second rotary driving device and said free-wheeling coupling includes an outer ring acted upon by the power drive for rotational adjustment, wherein the inner ring and the outer ring are arranged so as to be centered on an axis of rotation.

5. A drive assembly according to claim 4, wherein one of the inner and outer rings of the free-wheeling coupling includes at least one pivotably supported and spring-loaded locking pawl which engages at least one recess of the respective other ring.

6. A drive assembly according to claim 5, wherein the inner ring of the free-wheeling coupling is associated with two locking pawls which are arranged so as to be offset by 180° around the second axis of rotation and the outer ring includes four supporting recesses which are each arranged so as to be offset by 90° around an axis of rotation.

7. A drive assembly according to claim 4, wherein the first rotary driving device or the second rotary driving device includes a shaft coupled with the inner ring of the free-wheeling coupling in a rotationally fast way.

8. A drive assembly according to claim 3, wherein the power drive is a hydraulic cylinder which is connected to the outer ring of the free-wheeling coupling and to the respective implement portion.

* * * * *